United States Patent
Zamir

(10) Patent No.: US 10,019,274 B2
(45) Date of Patent: Jul. 10, 2018

(54) MENU BAR INTEGRATION IN DESKTOP VIRTUALIZATION ENVIRONMENTS

(71) Applicant: VMware, Inc., Palo Alto, CA (US)

(72) Inventor: Tal Zamir, Haifa (IL)

(73) Assignee: VMware, Inc., Palo Alto, CA (US)

( * ) Notice: Subject to any disclaimer, the term of this patent is extended or adjusted under 35 U.S.C. 154(b) by 110 days.

(21) Appl. No.: 15/017,890

(22) Filed: Feb. 8, 2016

(65) Prior Publication Data

US 2017/0228244 A1 Aug. 10, 2017

(51) Int. Cl.
*G06F 9/46* (2006.01)
*G06F 9/455* (2018.01)
*G06F 3/0482* (2013.01)
*G06F 9/54* (2006.01)

(52) U.S. Cl.
CPC ........ *G06F 9/45545* (2013.01); *G06F 3/0482* (2013.01); *G06F 9/543* (2013.01)

(58) Field of Classification Search
CPC ..... G06F 9/45545; G06F 3/0482; G06F 9/543
See application file for complete search history.

(56) References Cited

U.S. PATENT DOCUMENTS

| 6,067,087 | A  | * | 5/2000  | Krauss    | G06F 3/0482 712/245 |
| 9,448,825 | B2 | * | 9/2016  | Newell    | G06F 9/45545        |
| 2006/0005187 | A1 | * | 1/2006  | Neil      | G06F 9/455 718/1    |
| 2009/0106347 | A1 | * | 4/2009  | Harwood   | G06F 9/4445 709/203 |
| 2013/0290856 | A1 | * | 10/2013 | Beveridge | G06F 9/452 715/740  |
| 2013/0290857 | A1 | * | 10/2013 | Beveridge | G06F 3/0484 715/740 |
| 2013/0305025 | A1 | * | 11/2013 | Tsirkin   | G06F 9/4408 713/2   |

\* cited by examiner

*Primary Examiner* — Camquy Truong

(57) ABSTRACT

A system is described for integrating menu bars of applications executed on a virtual machine in a computing device with menu bars in the host operating system. A hosted hypervisor is executed on the computing device. The hypervisor manages a virtual machine running a guest operating system (OS) on the computing device. An application is executed on the guest OS. A call by the application to the guest OS is detected, the call requesting the guest OS to set a menu bar for the application. The call is intercepted, information regarding the content of the menu bar is retrieved from the intercepted call, and the information is used to set a menu bar for the application in the host OS. Subsequently, when a selection is made from the menu bar in the host OS, the selection is translated to the application running in the virtual machine to effectuate the selection.

14 Claims, 4 Drawing Sheets

MENU BAR INTEGRATION IN DESKTOP VIRTUALIZATION ENVIRONMENTS

TECHNICAL FIELD

The present disclosure generally relates to techniques for integrating various menu display formats in software applications and more specifically to techniques for integrating application menu bars in desktop virtualization environments.

BACKGROUND

Local desktop virtualization involves a computing device that hosts a guest virtual machine with a guest operating system (OS). A virtualized desktop runs on the computing device via the virtual machine using hardware virtualization or emulation. This type of desktop virtualization offers numerous advantages.

One advantage of desktop virtualization is allowing a user of a computing device that runs one operating system to run a different operating system on the device via a virtual machine. For example, a user of a computer running a Mac OS operating system, available from Apple, Inc., can run a virtual machine on the computer with a Windows operating system, available from Microsoft Corp. Accordingly, with local desktop virtualization, the user is able to use applications on her computer that might not be compatible with the computer's native OS. This may be useful in several scenarios, for example, if a user prefers to use one operating system, she may still be able to use applications on her computer that are only available on another operating system by executing a virtual machine on the computer with the other operating system. Similarly, local desktop virtualization is useful in numerous other contexts, such as for application testing, software development, and so on.

Latest technologies have made progress towards making the experience of using applications in virtualized desktops more akin to using native applications on the computing device. For example, some products allow an application that is running in a virtual machine to be presented in a window that sits directly in the host OS desktop by hiding the virtual machine's console view. Namely, instead of the application window appearing within another window that contains a view of the virtual machine's desktop, the application window can be displayed directly on the host desktop, making the user experience more akin to using the application directly in the host OS.

However, numerous problems and inconveniences still persist when using applications on virtual desktops. One such problem is that menu bar systems between operating systems are often different. Accordingly, a user accessing an application on a virtual machine is often faced with having to work with two different menu bar systems because the application's menu bar is set through the guest OS, while menu bars in the host OS are set through the host OS. Consequently, a user who is accustomed to using one menu bar system on her computing device may be forced to use a different menu bar system when accessing applications in the virtual desktop. A more efficient approach is desirable for integrating menu bars of applications in desktop virtualization environments.

DETAILED DESCRIPTION

Figure 1A:
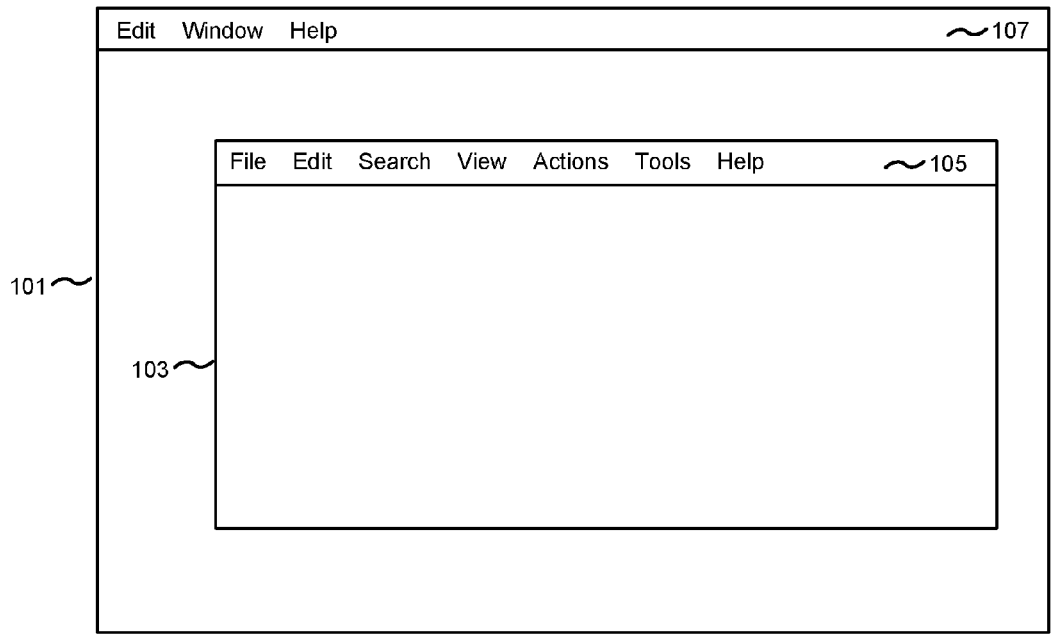
FIG. 1A illustrates an example screenshot of a computing device display containing a window of an application executed in a virtual machine, without implementation of menu bar integration.

Systems and methods in accordance with various embodiments of the present disclosure overcome at least some of the above mentioned shortcomings and deficiencies by providing more efficient ways to integrate menu bars of applications running on a virtual desktop in a computing device. In particular, embodiments described herein provide systems and methods for integrating menu bars of applications running within a virtual machine on a computing device with the menu bars of the computing device's native operating system.

As used throughout this disclosure, the term "hypervisor", also sometimes referred to as a virtual machine monitor or a virtual machine manager, refers to the software that runs virtual machines on a physical computer. The physical computer on which the hypervisor is running is usually referred to as the "host" computer, while the individual virtual machines are referred to as "guests". Each virtual machine (VM) can be a full virtual representation of a real physical computer, including a virtual representation of the hard drive, and the VM can run a full instance of a complete operating system (referred to as a "guest" operating system or "guest OS").

Hypervisors can generally be classified into two categories—the type 1 "native" hypervisors (also sometimes referred to as "bare metal" hypervisors) and the type 2 "hosted" hypervisors. Native hypervisors generally run directly on the host computer's hardware and native hypervisors can themselves host multiple virtual machines that have individual guest operating systems. In contrast, hosted hypervisors run within a conventional host operating system (e.g, Windows, Linux, etc.) and thus hosted hypervisors represent a second layer of software above the hardware. Various embodiments of the present invention are directed primarily to hosted hypervisor environments.

In various embodiments, a computing device running a host operating system ("host OS") executes a hosted hypervisor configured to manage a virtual machine on the computing device. The virtual machine runs a guest OS and provides a local virtual desktop to a user of the computing device. Applications can be executed in the virtual desktop on the guest OS. When an application is opened or becomes active in the virtual desktop, the application may attempt to set a menu bar. The application makes an application programming interface ("API") call to the guest OS requesting to set the menu bar. The system intercepts the API call and retrieves information related to the content and structure of the requested menu bar from the API call. The system then makes an API call to the host OS with the collected menu information requesting the host OS to set a menu bar for to the application. Subsequently, when a user makes a selection from the menu bar in the host OS, the selection is translated to a command corresponding to the menu item selection to the application running in the virtual machine, thereby producing the menu item selection in the application.

As a result, the menu bar of an application that is opened in the virtual desktop can be set in the host operating system, allowing the user to interact with the application by making selections in the menu bar from the host operating system. Consequently, a user of the computing device is not faced with having to work with two separate menu bar systems. Namely, menu bars of applications opened in the host OS and menu bars of applications opened in the guest OS through the virtual machine can both be set through the host OS. Thus, an application in the virtual desktop can appear to the user more similar to applications opened directly in the host OS, resulting in a more seamless and integrated user experience when working with applications in virtual desktops.

This can be particularly advantageous where the host OS and guest OS menu bar systems have functionally different layouts, such as the menu bar systems of Mac OS operating systems and Windows operating systems. Hence, a user who is accustomed to using the host OS on her computer can open an application on a virtual machine that is running a different OS (the guest OS), which utilizes a different menu bar system, and have a menu bar set for the application in the host OS, thereby avoiding the need to interface with two different menu bar systems. For example, a user of a computing device with a Mac OS host operating system may be able to open an application running on a Windows virtual machine and have the menu bar of the application set in the Mac OS.

FIG. 1A illustrates an example screenshot of a computing device display containing a window of an application executed in a virtual machine, without implementation of menu bar integration. As illustrated in the example of FIG. 1A, a desktop view 101 of the computing device contains a window 103 of an application running in a virtual machine on the computing device. In various embodiments, the computing device can execute a hosted hypervisor configured to manage the virtual machine on the computing device. The virtual machine runs a guest OS and provides the virtual desktop in which the application is executed.

Hosted hypervisor are well known in the art and details regarding their structure and operation are not discussed herein so as not to obscure salient points of the invention. Various hosted hypervisors are commercially available for performing the functions described in various embodiments herein. For example, local desktop virtualization can be used to run a Windows operating system virtual machine on a Mac OS host using a hypervisor such as the Oracle VM VirtualBox hypervisor by Oracle Corporation, the Parallels Desktop for Mac hypervisor by Parallels, Inc., or the VMware Fusion hypervisor by VMware, Inc. Other hypervisors, such as the VMware Workstation by VMware, Inc., are also available for running different configurations of desktop virtualization.

Further, it should be noted that in traditional desktop virtualization technologies, a window of an application that is opened in a virtual machine usually appears within the virtual machine's console view, which is normally a window displaying a view of the virtual machine's desktop. Hence, generally, an application window such as window 103 would appear within another window providing the virtual machine's console and a view of the virtual machine's desktop, instead of appearing directly on the desktop 101 as illustrated in the example of FIG. 1A. Today, available technologies allow an application that is running in a virtual machine to be displayed in a window 103 that sits directly on top of the host desktop 101 by hiding the VM's console window, as illustrated in the example of FIG. 1A.

For example, the Unity View feature available from VMware, Inc. for desktop virtualization platforms can run Windows applications in a VM on a Mac OS host without displaying the Windows desktop of the VM. By hiding the virtual machine's console window in this way, user experience can be improved. Namely, when an application window is not obscured by another surrounding window, user experience with the application is more akin to using native applications in the host OS. However, with previous technologies, the menu bar system of the application being executed in the VM may still be different than the menu bar system of native applications in the host OS. Integrating the menu bar of the application into the host OS, as further described herein, such that the menu bar appears the same as it would for a native application, can further improve user experience.

As illustrated in the example, the application window 103 contains an application menu bar 105 corresponding to the application that contains the menu items "File", "Edit", "Search", "View", "Actions", "Tools", and "Help". For example, by clicking on a menu item, the user may be able to access a drop-down menu containing further menu items. Accordingly, the user can interact with the application via the menu bar 105 by selecting menu items from the menu bar 105.

In the example of FIG. 1A, the application menu bar 105 is set in the window 103 through the guest OS. The desktop 101 further contains a menu bar 107 set through the host OS. The menu bar 107 corresponds to the window 103 in which the application is presented, allowing the user to control certain aspects of the window 103 via the menu bar 107 but not to interact with the application itself.

For example, the guest OS in the illustrated example can be a Windows operating system or any operating system that utilizes in-window menu bars (e.g., 105) in application windows (e.g., 103). As will be familiar to those skilled in the art, in a Windows operating system, when an application is opened, the menu bar for the application generally appears at the top of the application window (e.g., 103), such as the menu bar 105 in the window 103 in the example of FIG. 1A.

Further, the host OS in the illustrated example can be a Mac OS operating system or any operating system that utilizes a universal menu bar (e.g., 107) generally located in a fixed location of the desktop 101 (such as at the top, as illustrated) and not within the application window (e.g., 103). In such an operating system, the universal menu bar generally displays a menu for whatever application the user is focused on, i.e., whichever application is active at the time. For example, when a user focuses on an application on the desktop, e.g., by clicking a mouse cursor on a window of the application, the menu items for the application get populated into the universal menu bar on the screen and the user can interact with the application menus through the universal menu bar.

Accordingly, because the computing device of FIG. 1A runs the host OS, when an application is opened directly in the host OS, the menu items for the application generally appear in the menu bar 107 and a menu bar (e.g., 105) would not be present in the application window (e.g., 103). However, because the application that is opened in the illustrated example is opened through the guest OS of the virtual machine running on the computing device, the menu bar 105 for the application is set through the guest OS and appears within the application window 103 instead of in the menu bar of the host OS 107, as would happen for native applications. Accordingly, certain inconvenience can be imposed on the user by having to use a different menu bar system for applications opened in the virtual machine than for native applications. The systems and methods described herein can improve user experience by integrating the menu bar 105 of the application into the host OS menu bar 107, to make the experience of using applications running on the virtual machine more akin to using a native application in the host OS.

Figure 1B:
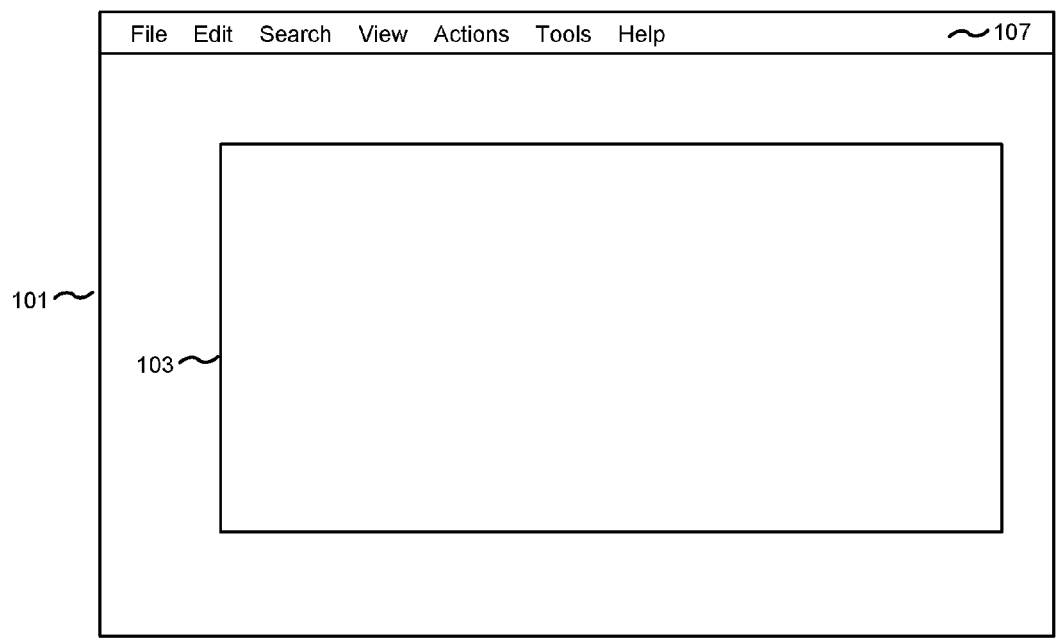
FIG. 1B illustrates an example screenshot of a computing device display containing a window of an application executed in a virtual machine, with implementation of menu bar integration, in accordance with various embodiments.

FIG. 1B illustrates an example screenshot of a computing device display containing a window of an application executed in a virtual machine, with implementation of menu bar integration, in accordance with various embodiments. As illustrated in the example of FIG. 1B, with menu bar integration, the menu items corresponding to the application are now contained in the menu bar 107 of the host OS. Namely, the menu items from the application menu bar 105 illustrated in FIG. 1A have been placed in the menu bar 107 of the host OS. The user can now interact with the application menus from the menu bar 107, in the same way that she would with a native application in the host OS. Additionally, the menu bar 105 has been removed from the application window 103 to imitate a native application user experience. In other embodiments, the menu bar 105 can be left to remain in the application window 103; for example, this may be done to preserve the original look and feel of the application, or to allow the user to interact with the application using either menu bar 105 or menu bar 107. In yet another embodiment, the user can be given an option on whether to remove the menu bar 105 from the application window 103 or to preserve it. The mechanism behind the menu bar integration will be discussed in more detail below.

It should be noted that while the example of FIGS. 1A and 1B illustrate menu bar integration in a computing device containing a host OS that utilizes universal menu bars, such as the Mac OS operating system, and a guest OS that utilizes in-window menu bars, such as the Windows operating system, embodiments described herein may be applicable to other operating systems and to other host OS/guest OS configurations. For example, embodiments may be applicable in configurations where the host OS is a Windows operating system and the guest OS is a Mac OS operating system. In this scenario, the system could place menu bars in the Windows host OS for applications running on a Mac OS virtual machine on the computing device. Furthermore, embodiments described herein can be implemented with operating systems other than Windows or Mac OS, such as; for example, a Linux operating system.

Figure 2:
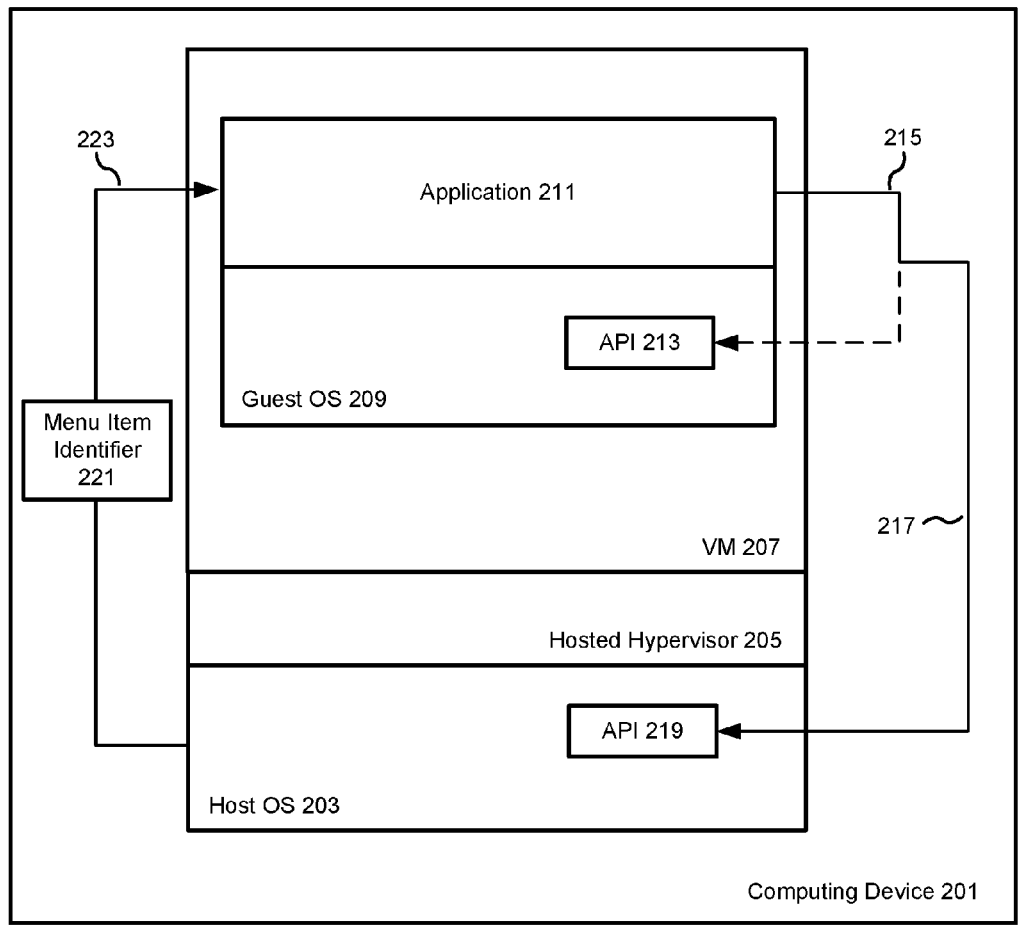
FIG. 2 illustrates a detailed view of a computing device executing a virtual machine via a hosted hypervisor implementing menu bar integration, in accordance with various embodiments.

FIG. 2 illustrates a detailed view of a computing device executing a virtual machine via a hosted hypervisor implementing menu bar integration, in accordance with various embodiments. As illustrated in the example of FIG. 2, a hosted hypervisor 205 is executed on a host OS 203 of a computing device 201. A virtual machine (VM) 207 is executed on top of the hosted hypervisor 205 and is managed by the hosted hypervisor 205. The VM 207 runs a guest OS 209 and an application 211 is executed on the guest OS 209. In various embodiments, when application 211 attempts to set up a menu bar, such as when the application 211 is launched, is focused on, or otherwise becomes active, as the case may be, the application 211 makes a call 215 to an application programming interface (API) 213 of the guest OS 209 requesting the guest OS 209 to set the menu bar. For example, if the guest OS 209 is a Windows operating system, the application 211 can make a standard Windows API call (e.g., 215) to the API 213 of the guest OS 209 requesting the Windows operating system to set a menu bar in a window of the application.

In various embodiments, the system can detect the API call 215 and intercept it. For example, in an embodiment, the system (e.g., a filter driver in the guest OS 209) can monitor application 211 calls to detect the API call 215 and, instead of passing the call 215 to the API 213 of the guest OS 209, the system can intercept the call 215 (as indicated by the broken arrow portion of the arrow). Once the system intercepts the call 215, it can inspect the call 215 to retrieve all necessary information regarding the menu items, content, and structure of the requested menu bar in order to be able to accurately reproduce the menu bar. In various embodiments, this information can be provided to the hosted hypervisor 205, which can subsequently make a call 217 to an API 219 of the host OS 203 based on the retrieved information requesting the host OS 203 to set a menu bar with the application-specific menu items in the host OS 203, or to populate a menu bar in the host OS 203 with the application-specific menu items.

For example, the system can retrieve from the API call 215 information such as menu structure, structure of any drop down menus or sub-menus, menu items, menu item identifiers, or any other information necessary to reproduce the menu bar, such that the API call 217 to the host OS 203 can request a menu bar with the same structure, sub-menus, menu items, etc. as requested by the original API call 215. In various embodiments, the system can restructure the information to a format suitable for the API 219 of the host OS 203, as necessary, such that the call 217 can be properly understood by the API 219, in order to set the menu bar for the application in the host OS 203.

For example, if the guest OS 209 is a Windows operating system and the host OS 203 is a Mac OS operating system, the system can detect and intercept the call 215 from the application 211 to the Windows API 213 requesting the Windows guest OS 209 to set a menu bar in a window of the application. The system can retrieve information regarding the requested menu bar from the call 215, and make a call 217 to the API 219 of the Mac OS host OS 203 based on the retrieved information, requesting the host OS 203 to populate the universal menu bar (usually at the top of the host desktop) with the application-specific items.

Further, in situations where the guest operating system 209 utilizes in-window menu bars (e.g., a Windows operating system) and the host OS 203 does not utilize in-window menu bars (e.g., a Mac OS operating system), the system can be configured such that a menu bar does not appear in or is removed from the window of the application 211 (e.g., to avoid redundant menu bars appearing in the guest OS 209 and host OS 203). For example, when the menu bar is generated in a Windows guest OS (e.g., 203) using a standard Windows control, common control commands can be used to hide the menu bar.

In various embodiments, the functions related to monitoring API calls (e.g., 215), intercepting API calls (e.g., 215), retrieving menu item information from the intercepted API calls (e.g., 215), and making an API call 217 to the API 219 of the host OS 203 can be performed by software (e.g., a filter driver) on the guest OS 209 or by the hosted hypervisor 205, or a combination of the two. For example, software running on the guest OS 209 can be in communication with the hosted hypervisor 205 to create a communication channel with the host OS 203. Functions requiring communication across the hypervisor 205, e.g., between the application 211 or guest OS 209 and the host OS 203, such as the API call 217 can be performed over this channel. In an embodiment, software on the guest OS 209 can perform the functions of intercepting the API call 215 and retrieving the information from the API call 215. That software can provide the information from the API 215 call to the hosted hypervisor 205. Subsequently, the hypervisor can perform the function of making the API call 217 to the host OS API 219 requesting the host OS 203 to set the menu bar for the application 211.

After the menu bar for the application 211 is set in the host OS 203, selections of menu items from the menu bar can be translated from the host OS 203 to the application 211 in order to effectuate the menu item selections, such that the user can interact with the application 211 via the menu bar from the host OS 203 in the same way that she would if the menu bar was set in the guest OS 209. For example, the system can detect a selection of a menu item from the menu bar in the host OS 203, such as when a user of the computing device selects a menu item from the menu bar, and translate a command or message corresponding to the menu item selection to the application 211 in the virtual machine 207.

In various embodiments, a menu item selection can be translated from the menu bar in the host OS 203 to the application 211 by conveying a menu item identifier 221 from the host OS 203 to the application 211. In various embodiments, the menu item identifier 221 contains any information necessary for communicating a selection of a menu item. For example, the menu item identifier 221 can contain an identifier of the menu bar item that is selected as well as an identifier of the relevant window on which the menu bar is selected. Each menu item in the menu bar can have a unique identifier (e.g., 221) associated with it. When the system detects a selection of a menu item in the menu bar, the system can retrieve an identifier 221 associated with the menu item and forward the identifier 221 to the application 211 to produce the menu item selection in the application 211, as illustrated in the example of FIG. 2 by the arrow 223 conveying the menu item identifier 221 from the host OS 203 to the application 211.

In various embodiments, the function of translating the menu item selection from the menu bar in the host OS 203 to the application 211 can be performed, at least in part, by the hosted hypervisor 205. For example, the hosted hypervisor 205 can receive the menu item identifier 221 corresponding to the menu item selection from the host OS 203 and forward the identifier 221 to the application 211 to produce the menu item selection in the application 211.

Figure 3:
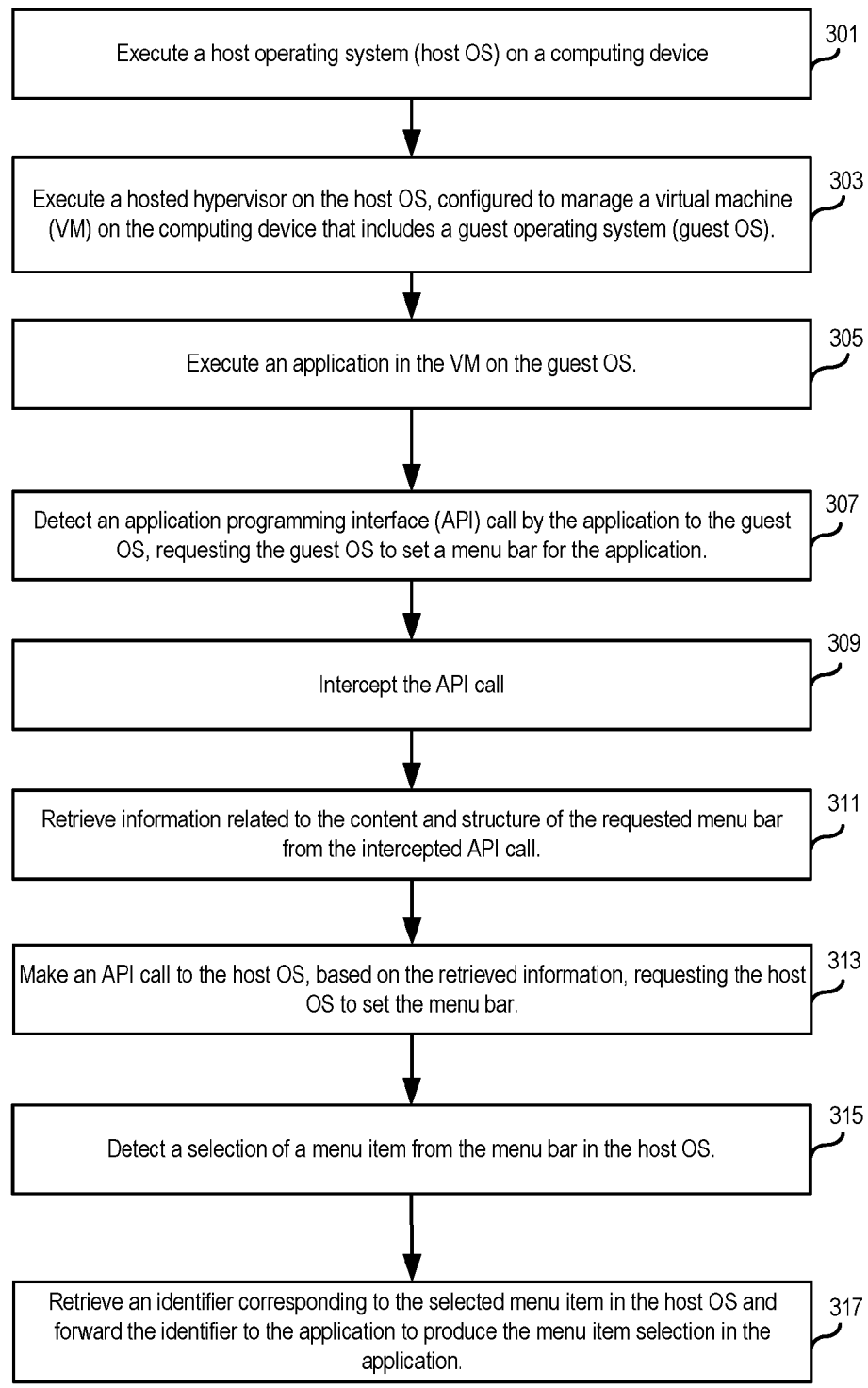
FIG. 3 illustrates an example process flow for menu bar integration, in accordance with various embodiments.

FIG. 3 illustrates an example process flow for menu bar integration, in accordance with various embodiments. In operation 301, a host operating system (host OS) is executed on a computing device. In operation 303, a hosted hypervisor is executed on the host OS, configured to manage a virtual machine on the computing device that includes a guest operating system (guest OS). In operation 305, an application is executed in the VM on the guest OS. In operation 307, an application programming interface (API) call by the application to the guest OS, requesting the guest OS to set a menu bar for the application, is detected. In various embodiments, the application can make such an API call to set a menu bar when the application is launched, when it becomes active on the desktop, or when a user places focus (e.g., by selecting or clicking in the application window with a mouse pointer). In operation 309, the API call is intercepted. In an embodiment, the step of detecting the call 307 and/or the step of intercepting the call 309 can be performed by software running on the guest OS, such as by a filter driver installed in the guest OS.

In operation 311, information related to the content and structure of the requested menu bar is retrieved from the intercepted API call. In various embodiments, the information retrieved can include any information needed to replicate the menu bar, including the menu items, menu item positions, menu item identifiers, structure of the menu including any sub-menus and drop-down menus, and so on. In various embodiments, operation 311 can be performed in software executed on the guest OS and/or in the hypervisor. In operation 313, an API call is made to the host OS, based on the retrieved information, requesting the host OS to set the menu bar. In various embodiments, step 313 can be performed by the hypervisor.

After the menu bar is set up in the host OS, in operation 315, a selection of a menu item from the menu bar in the host OS is detected. For example, the selection can be made by a user of the computing device clicking on a menu item in the menu bar. In operation 317, an identifier corresponding to the selected menu item is retrieved in the host OS and forwarded to the application to produce the menu item selection in the application. In various embodiments, the hosted hypervisor can be configured to perform the steps of detecting the selection of a menu item 315 and/or retrieving and forwarding the menu item identifier to produce the menu item selection in the application 317.

Figure 4:
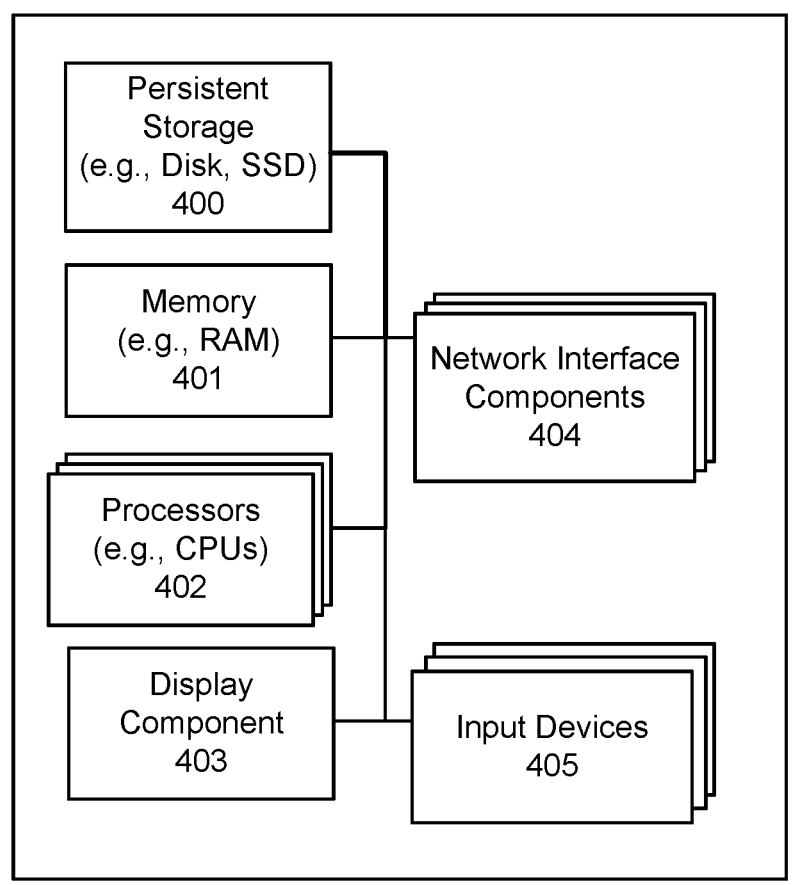
FIG. 4 illustrates an example of some general components of a computing device that can be utilized in conjunction with various embodiments described in the present specification.

FIG. 4 illustrates an example of some general components of a computing device that can be utilized in conjunction with various embodiments described in the present specification. In this particular example, the computing device includes one or more processors (e.g., central processing units (CPUs) 402 for executing instructions that can be stored in a storage medium. The storage medium may take the form of memory 401 (e.g., RAM), persistent storage 400 (e.g., disk, flash, SSD, etc.) or any combination thereof. As used herein, the terms "storage medium", "computer readable storage medium", and "non-transitory storage medium" are all used interchangeably and can include many different types of volatile memory or persistent storage, such as random access memory (RAM) storing program instructions for execution by the processor 402, a separate form of storage for images or data, a removable memory for sharing information with other devices and the like.

The computing device typically further comprises a display component 403, such as a computer monitor, a touch screen, liquid crystal display (LCD), light-emitting diode (LED) display, or the like. The display component 403 is conventionally used to display images or information to the user so that the user may interact with the computing device. In various embodiments, the computing device will also include a set of input devices 405 capable of receiving input from a user. This input can include, for example, a conventional keyboard, a mouse, a button, a touch pad, a touch screen, or any other such component whereby a user can input a command to the device, provide information to the device or otherwise interact with the device. In some embodiments, the computing device can include one or more network interface components (NICs) 404 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method, comprising:
   executing a host operating system (host OS) on a computing device;
   executing a hosted hypervisor on the host OS, the hosted hypervisor configured to manage a virtual machine on the computing device that includes a guest operating system (guest OS);
   executing an application on the guest OS;
   detecting an application programming interface (API) call by the application to the guest OS, the API call requesting the guest OS to set a menu bar for the application;
   intercepting the API call;
   retrieving information from the intercepted API call related to the content and structure of the requested menu bar;
   using the retrieved information to set a menu bar in the host OS corresponding to the menu bar requested by the application running in the guest OS wherein a user is able to interact with the application running in the guest OS via the menu bar in the host OS;
   detecting a selection of a menu item from the menu bar in the host OS;
   translating a command corresponding to the menu item selection to the application in the virtual machine, comprising:
      receiving, by the hosted hypervisor, an identifier corresponding to the selected menu item from the host OS; and
      forwarding the identifier to the application to produce the menu item selection in the application.

2. The method of claim 1, wherein at least one of:
   the host OS is a Mac OS operating system and the guest OS is a Windows operating system; or
   the guest OS is a Mac OS operating system and the host OS is a Windows operating system.

3. The method of claim 1, wherein the guest OS is configured to utilize in-window menu bars and the host OS is not configured to utilize in-window menu bars; and
   further comprising removing the menu bar from the application window.

4. The method of claim 1, wherein the using the retrieved information to set a menu bar for the application in the host OS comprises the hosted hypervisor making an API call to the host OS requesting the host OS to set the menu bar.

5. The method of claim 1, wherein the application window is displayed directly on a desktop of the host OS.

6. A computing device, comprising:
    at least one processor; and
    memory including instructions that, when executed by the at least one processor, cause the computing device to:
    execute a host operating system (host OS) on the computing device;
    execute a hosted hypervisor on the host OS, the hosted hypervisor configured to manage a virtual machine on the computing device that includes a guest operating system (guest OS);
    execute an application on the guest OS;
    detect an application programming interface (API) call by the application to the guest OS, the API call requesting the guest OS to set a menu bar for the application;
    intercept the API call;
    retrieve information from the intercepted API call related to the content and structure of the requested menu bar;
    use the retrieved information to set a menu bar in the host OS corresponding to the menu bar requested by the application running in the guest OS wherein a user is able to interact with the application running in the guest OS via the menu bar in the host OS;
    detect a selection of a menu item from the menu bar in the host OS;
    translate a command corresponding to the menu item selection to the application in the virtual machine, comprising:
        receiving, by the hosted hypervisor, an identifier corresponding to the selected menu item from the host OS; and
        forwarding the identifier to the application to produce the menu item selection in the application.

7. The computing device of claim 6, wherein at least one of:
    the host OS is a Mac OS operating system and the guest OS is a Windows operating system; or
    the guest OS is a Mac OS operating system and the host OS is a Windows operating system.

8. The computing device of claim 6, wherein the guest OS is configured to utilize in-window menu bars and the host OS is not configured to utilize in-window menu bars; and
    wherein the memory further includes instructions that when executed by the at least one processor, cause the computing device to remove the menu bar from the application window.

9. The computing device of claim 6, wherein the using the retrieved information to set a menu bar for the application in the host OS comprises the hosted hypervisor making an API call to the host OS requesting the host OS to set the menu bar.

10. The computing device of claim 6, wherein the application window is displayed directly on a desktop of the host OS.

11. A non-transitory computer readable storage medium comprising one or more sequences of instructions, the instructions when executed by one or more processors causing the one or more processors to execute the operations of:
    executing a host operating system (host OS) on a computing device;
    executing a hosted hypervisor on the host OS, the hosted hypervisor configured to manage a virtual machine on the computing device that includes a guest operating system (guest OS);
    executing an application on the guest OS;
    detecting an application programming interface (API) call by the application to the guest OS, the API call requesting the guest OS to set a menu bar for the application;
    intercepting the API call;
    retrieving information from the intercepted API call related to the content and structure of the requested menu bar;
    using the retrieved information to set a menu bar in the host OS corresponding to the menu bar requested by the application running in the guest OS wherein a user is able to interact with the application running in the guest OS via the menu bar in the host OS;
    detecting a selection of a menu item from the menu bar in the host OS;
    translating a command corresponding to the menu item selection to the application in the virtual machine, comprising:
        receiving, by the hosted hypervisor, an identifier corresponding to the selected menu item from the host OS; and
        forwarding the identifier to the application to produce the menu item selection in the application.

12. The non-transitory computer readable storage medium of claim 11, wherein at least one of:
    the host OS is a Mac OS operating system and the guest OS is a Windows operating system; or
    the guest OS is a Mac OS operating system and the host OS is a Windows operating system.

13. The non-transitory computer readable storage medium of claim 11, wherein the guest OS is configured to utilize in-window menu bars and the host OS is not configured to utilize in-window menu bars; and
    further comprising instructions that when executed by the one or more processors cause the one or more processors to execute the operations of removing the menu bar from the application window.

14. The non-transitory computer readable storage medium of claim 11, wherein the using the retrieved information to set a menu bar for the application in the host OS comprises the hosted hypervisor making an API call to the host OS requesting the host OS to set the menu bar.

* * * * *